March 19, 1935.  A. R. VAN C. WARRINGTON  1,995,162
CONTROL OF ELECTRORESPONSIVE DEVICES
Filed Dec. 28, 1933    3 Sheets-Sheet 1

Inventor:
Albert R. vanC. Warrington,
by Harry E. Dunham
His Attorney.

Inventor:
Albert R. vanC. Warrington,
by Harry E. Dunham
His Attorney.

March 19, 1935.  A. R. VAN C. WARRINGTON  1,995,162
CONTROL OF ELECTRORESPONSIVE DEVICES
Filed Dec. 28, 1933    3 Sheets-Sheet 3

Inventor:
Albert R. vanC. Warrington,
by Harry E. Dunham
His Attorney

Patented Mar. 19, 1935

1,995,162

UNITED STATES PATENT OFFICE 1,995,162

CONTROL OF ELECTRORESPONSIVE DEVICES

Albert R. van C. Warrington, Springfield, Pa., assignor to General Electric Company, a corporation of New York Application December 28, 1933, Serial No. 704,293

14 Claims. (Cl. 175—294)

My invention relates to improvements in the control of electroresponsive devices and especially in the selective energization of such devices for operation under a variety of conditions. More particularly, my invention relates to improvements in the selective energization of distance relays in protective systems in a manner which is dependent on the nature of the fault. An object of my invention is to provide improved selective energization arrangements for electroresponsive devices whereby with a minimum number of devices a wide latitude of operation is available to secure the particular operation essential under given conditions. Another object of my invention is to provide an improved distance type of protective arrangement with a selective energization control whereby with a minimum number of distance relays it is possible to secure a substantially uniform distance response for all faults at a given location. This uniformity of response is, of course, on the basis that each kind of fault has of itself substantially the same impedance characteristic, for example the same ohmic impedance, resistance or reactance depending upon which of these impedance characteristics the distance relay is to respond. These and other objects of my invention will appear in more detail hereinafter.

My invention will be better understood from the following description when considered in connection with the accompanying three sheets of drawings and its scope will be pointed out in the appended claims.

Figure 1:
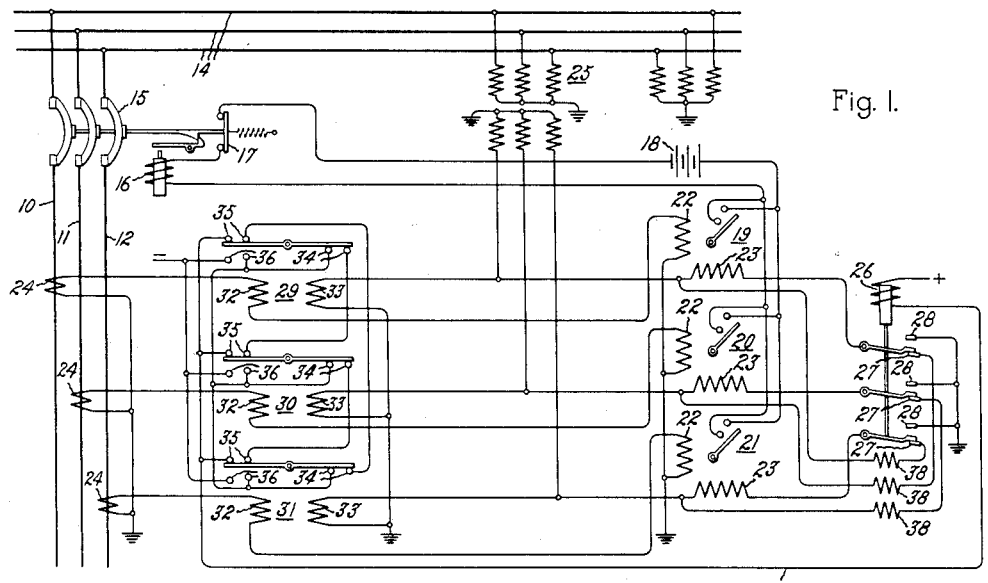
Figure 2:
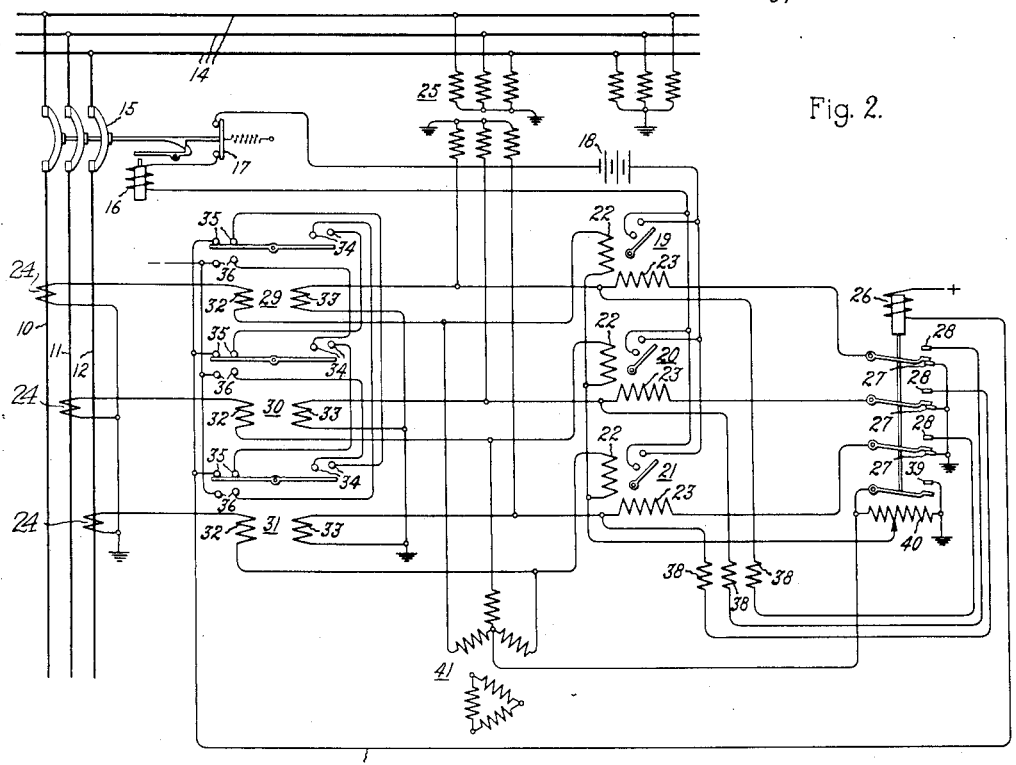
Figure 3A:
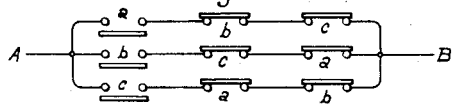
Figure 3D:
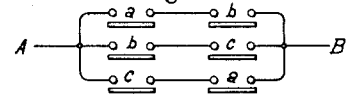
Figure 3B:
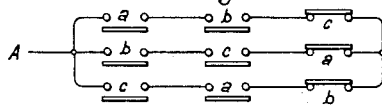
Figure 3E:
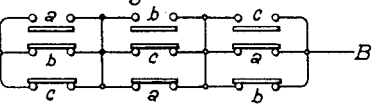
Figure 4:
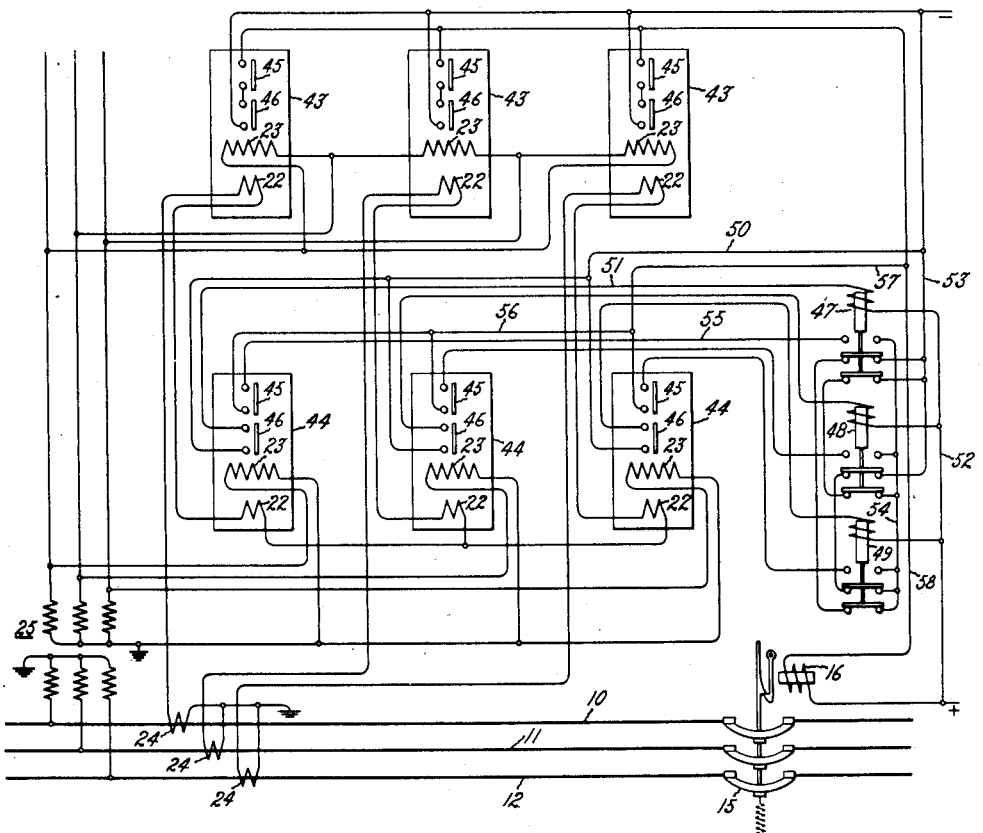
Figure 5:
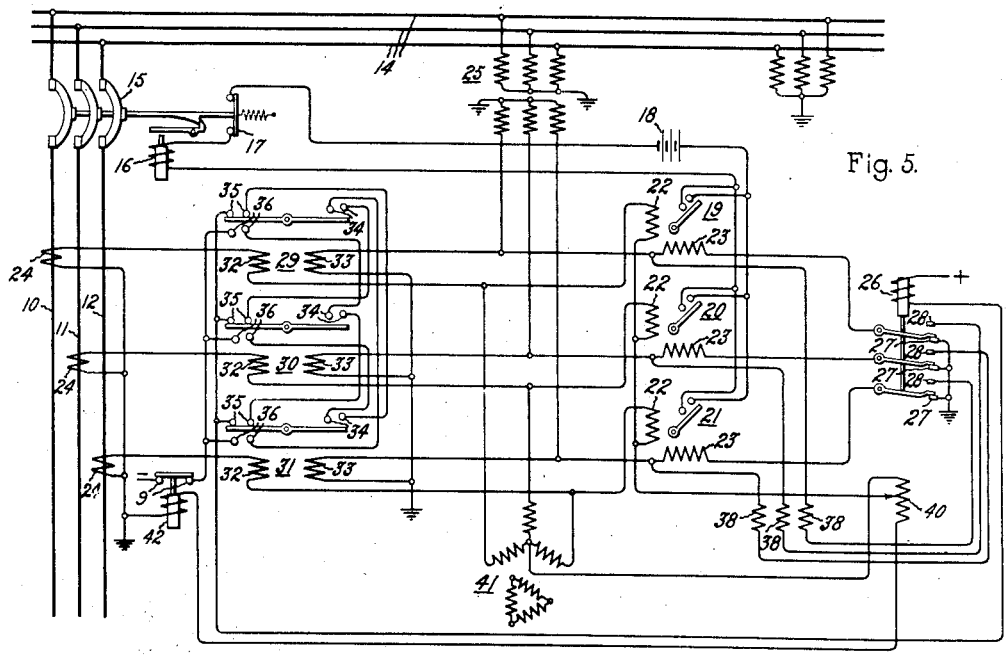
Figure 6:
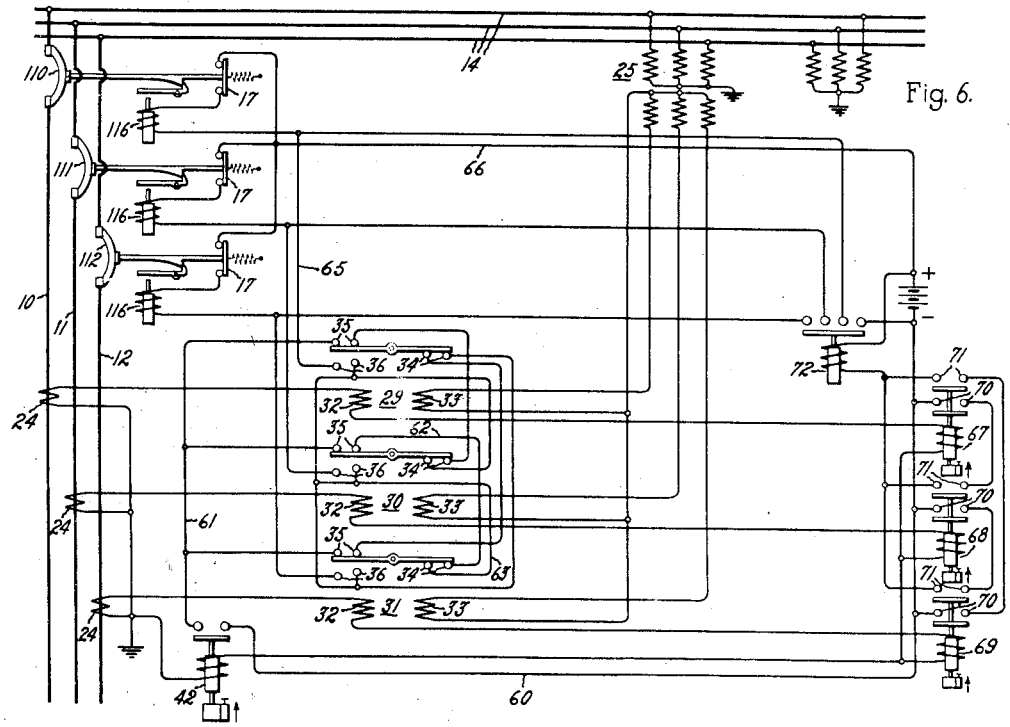

In the accompanying drawings, Fig. 1 illustrates diagrammatically an embodiment of my invention as applied to a distance type of protective arrangement; Fig. 2 illustrates diagrammatically a modification of the embodiment of my invention shown in Fig. 1; Figs. 3a to f inclusive show schematically selective control arrangements according to my invention; and Figs. 4, 5 and 6 illustrate diagrammatically other modifications of my invention.

In the embodiment of my invention illustrated in Fig. 1, a polyphase circuit, such as a feeder having phase conductors 10, 11 and 12, is arranged to be connected to a suitably grounded three-phase bus 14 through suitable circuit interrupting means shown as a latched closed circuit breaker 15 provided with a trip coil 16 and an auxiliary switch 17, which is arranged to be closed when the circuit breaker is closed and opened when the circuit breaker is open. A source of current 18 is provided for energizing the trip coil 16.

In order to control the circuit breaker 15 in response to abnormal conditions on the circuit 10, 11 and 12, and in accordance with the location of the faults, there are provided a plurality of protective relays 19, 20 and 21 of the so-called distance type. In so far as my invention is concerned, the particular type of distance relay employed is immaterial and I have accordingly illustrated the distance relays as having current and voltage coils 22, 23, respectively, which are connected to be energized from the circuit 10, 11 and 12 in accordance with currents and voltages derived therefrom by any suitable means illustrated as current transformers 24 and a potential transformer 25.

In order to minimize the number of distance relays required for protection of the circuit 10, 11 and 12 against all kinds of faults, I provide in accordance with the principles of my invention means for so controlling the energization of the distance relays 19, 20, 21 as to insure a substantially uniform distance response of each of these relays for all faults at a given location, regardless of the number of phase conductors which may be involved in the faults.

Thus, in the embodiment of my invention shown in Fig. 1, I provide means for selectively controlling the energization of the voltage windings 23 of the distance relays so that these windings may be energized either in accordance with the delta or the Y voltages of the circuit 10, 11 and 12, as derived from the bus 14 through the potential transformer 25. The selective control in accordance with my invention includes a connecting means, such as the electromagnetic switching or transfer device 26 which, when deenergized, is in the position shown in the drawings. This position will be termed the normal position. In this position the connecting means 26 through its lower contacts 27 applies delta voltages to the voltage windings 23 of the distance relays 19, 20, 21 in the order in which these relays are associated with the phases of the circuit. Similarly when the connecting means 26 is energized to close its upper contacts 28, there are applied to the voltage windings 23 of the distance relays, the Y voltages of the circuit 10, 11, 12, as derived from the bus 14 through the potential transformer 25. These voltages are also applied to the voltage windings in accordance with the respective phases with which the different distance relays are associated.

In order selectively to apply the different voltage energizations to the voltage windings of the distance relays, I provide suitable means 29, 30 and 31 connected to be energized from the circuit for controlling the connecting means or auxiliary device 26 to obtain the desired voltage energization under different types of faults. While the selective control means 29, 30 and 31 may be of any suitable character responsive to faults, I may use selector relays which are responsive to a predetermined relation between a current and a voltage of the circuit 10, 11, 12 in order to have a selective action which is independent of the normal load currents which the line may be carrying at different times. Thus, the relays 29, 30 and 31 have current windings 32 which are respectively connected to be energized in accordance with the currents in the phase conductors 10, 11 and 12 through the current transformers 24 in these phase conductors and voltage windings 33 which are connected to be energized in accordance with the respective Y voltages of the circuit 10, 11 and 12 through the potential transformer 25.

Each of the selector relays 29, 30 and 31 is provided with three sets of contacts 34, 35 and 36 of which the first two sets are normally closed and the third is normally open but upon the occurrence of a fault producing the predetermined current-voltage relation to which the selector relay is responsive the contacts 36 are closed and the contacts 34 and 35 open. The arrangement of these contacts is schematically shown in Fig. 3a. The arrangement of the circuits controlled by these contacts is such that the voltage windings 23 of the distance relays 19, 20 and 21 are connected for energization in accordance with the Y voltages of the circuit only on the occurrence of a fault involving but one phase conductor. At all other times the voltages applied to the voltage windings 23 of the distance relays are the delta voltages of the circuit 10, 11, 12.

Assuming the parts to be positioned as shown in Fig. 1 and that a fault occurs involving any one of the phase conductors 10, 11 and 12 to ground, for example the conductor 10, then the selector relay 29 associated with this conductor will operate when the predetermined current-voltage relation for which it is set to respond occurs but the selector relays 30 and 31 will not operate. In this case the contacts 34 and 35 of the relay 29 are opened and the contacts 36 are closed. It will be noted that the contacts 36 of the relay 29 are in series with the contacts 34 of the relay 30 and the contacts 35 of the relay 31. Similar statements apply to circuits for each of these relays. Thus, upon the operation of the relay 29 the connecting device 26 is energized through a circuit from minus through the contacts 36 of the relay 29, the contacts 34 of the relay 30, the contacts 35 of the relay 31, the conductor 37 and the winding of the connecting means 26 to plus. Upon energization the connecting means 26 opens its contacts 27 and closes its contacts 28 to apply the Y voltages of the circuit to the voltage coils of the distance relays 19, 20 and 21.

Inasmuch as the completion of the energizing circuit of the connecting means 26 is dependent upon one set of normally closed contacts of two of these devices 29, 30, 31 being closed and a set of normally open contacts of the third one of the devices being closed, it will be observed that any fault which causes the operation of at least two of the selector relays must necessarily open the energizing circuit of the connecting device 26. Consequently, for any fault which involves more than one phase conductor whether it be a fault to ground of two or more conductors or a fault between two or more phase conductors and not involving ground, the connecting device 26 will not be energized and consequently the voltage windings 23 of the distance relays will be energized in accordance with the delta voltages of the circuit. In order to insure the desired uniformity of response of the distance relays 19, 20 and 21 under different types of faults, suitable impedance means 38 for properly balancing the impedance characteristic to which the distance relays are to respond may be connected in series relation with the lower contacts 27 of the connecting means 26 and the respective voltage windings 23.

In the embodiment of my invention shown in Fig. 2, I control not only the energizations of the voltage coils 23 of the distance relays 19, 20 and 21 so as to obtain the quickest response under desired conditions, but I also provide means for controlling the energization of the current windings to obtain the maximum degree of distance response accuracy. Thus, for example, in faults which involve all of the phase conductors and, therefore, the greatest chance of instability, it is desirable to have the quickest possible response of the distance relays. Likewise, in faults involving only a single conductor, such as a ground fault, it is desirable to obtain the quickest possible operation in order to avoid arc spreading which may involve other phase conductors. Accordingly, I arrange the connecting means 26 so that it normally applies Y voltages to the voltage windings of the distance relays and thereby save the time of operation of the connecting means for faults involving three conductors or only one conductor. For all other faults, the selector relays are arranged so to control the connecting means 26 as to apply delta voltages to the voltage windings of the distance relays.

In order to provide the necessary current compensation or energization control, I provide suitable means, such as an auto-transformer 40, for superimposing on the line currents supplied to the current windings of the distance relays a residual current on the occurrence of ground faults. For this purpose, the auto-transformer 40 is connected between the star point of the current windings of the distance relays and the star point of a Y-delta transformer 41, whose Y connected windings are respectively connected to the leads of the current transformers 24 in the different phases of the circuit 10, 11 and 12. In order to control the superposition of the residual current of the auto-transformer under given fault conditions, I may provide the connecting means 26 with the additional contact 39 which is arranged to complete a short circuit across the auto-transformer 40.

In this embodiment of my invention the selector relays 29, 30 and 31 are arranged to have the contacts 35 normally closed and the contacts 34 and 36 normally open. The arrangement of these contacts is schematically shown in Fig. 3b, if the contact 9 thereof is omitted. The energization of the connecting means 26 is so controlled by the selector relays that two of these relays must operate and the other must not in order that the connecting means 26 may be energized.

Assuming the parts positioned as shown in Fig. 2 and that a fault occurs between two phase conductors, for example 10 and 11, but not involving ground, then both of the selector relays 29 and 30 associated with these phase conductors operate. In this case the circuit of the connecting means 26 is completed from minus, through the contacts 36 of the selector relay 29, the contacts 34 of the selector relay 30, the contacts 35 of the selector relay 31, the conductor 37 and the winding of connecting means 26 to plus. The connecting device 26 being thus energized opens its contacts 27 and closes its contacts 28 to apply delta voltages to the voltage windings of the distance relays 19, 20 and 21. At the same time the connecting device 26 closes its contact 39 to short circuit the auto-transformer 40 but since there is no residual current in the circuit 10, 11 and 12, because of the fault assumed, to affect the operation of the distance relay, nothing happens as a result of this closing operation of the contact 39. Accordingly, the distance relays associated with the faulted conductors are energized in accordance with the current in these conductors and one of them, the distance relay 19, has its voltage winding energized in accordance with the voltage between these conductors. The distance relay 19 accordingly responds with the proper distance characteristic, suitable balancing impedances 38 being supplied as in Fig. 1.

In case of a fault involving all of the phase conductors 10, 11 and 12, all of the selector relays 29, 30 and 31 operate and the circuit of the connecting device 26 is not completed. Accordingly, the voltage windings of the distance relays are energized by the Y voltages of the circuit 10, 11 and 12 and the current windings in accordance with the currents in the respective phase conductors of the circuit. In this case, the auto-transformer is not short circuited but this is immaterial because there is no residual current to superpose on the current windings of the distance relays.

In case of a fault involving one phase conductor to ground, for example phase conductor 10, only the selector relay 29 associated with this conductor will operate. Accordingly, the connecting device 26 is not energized and the voltage windings of the distance relays are energized in accordance with the Y voltages of the circuit, as shown in the drawings. In this case there is a residual current which appears in the shunt winding of the auto-transformer, that is, the portion to the right of arrow, and this is reflected in the series winding of the auto-transformer, that is, the portion to the left of the arrow, to be superimposed on the current winding 22 of the distance relay 19 through the transformer 41 in such a way as to have an additive effect to the line current in this winding. By suitable choice of the transformation ratio of the auto-transformer 40, the amount of superimposed current may be controlled as desired. The desired amount of residual current $I_r$ to be added is $KI_r$ where $$K = \frac{X_z}{X_p}$$

$X_z$ being the zero sequence impedance between the relay and fault and $X_p$ the positive sequence.

In case of a fault involving two conductors to ground, for example the phase conductors 10 and 11, each of the distance relays associated with these conductors will operate and the circuit of the connecting means will be completed in the manner heretofore described for a fault involving these two conductors but not ground. Accordingly, when the connecting device 26 is energized, delta voltages are applied to the voltage windings of the distance relays 19 and 20. Inasmuch as the connecting device closes its contact 39 and short-circuits the auto-transformer 40, the line current appearing in the current windings of the distance relays 19 and 20 is reduced by one-third of the residual current, i.e. the zero sequence component of the line current is in effect neutralized since the residual current from the current transformers 24 associated with the faulted conductors 10 and 11 is by-passed through the transformer 41 and the connecting switch contact 39 to the star point of the current transformers 24. Consequently, there is left in the current windings of the distance relays 19 and 20 only the positive and negative sequence components of the line currents to cooperate with the delta voltages of the circuit which contain only the positive and negative sequence components of voltage. The operation of the relays is accordingly dependent only on the positive and negative phase sequence components of the circuit impedance and, therefore, correctly proportional to the distance between the relay and the fault.

The embodiment of my invention shown in Fig. 5 is substantially identical to that shown in Fig. 2, except that the contact 39 of the connecting device 26 is omitted and a residual current selector relay 42 is provided so as to control through its contacts 9, in connection with the selector relays 29, 30 and 31, the voltage applied to the voltage windings of the distance relays 19, 20 and 21 in order to prevent the application of delta voltage during faults involving two conductors to ground. The arrangement of the contacts 34, 35, 36 and 9 is schematically shown in Fig. 3b. The operation of this embodiment of my invention is the same as the operation of the arrangement shown in Fig. 2 except that in case of a fault, involving two conductors to ground the connecting device 26 is not energized due to the operation of the residual current relay whose normally closed contacts in series with the winding of the relay 26 are opened. Thus, the voltage windings of the distance relays remain energized by the Y voltages and the current windings are energized by the line current with a suitable proportion of residual current added thereto. This arrangement accordingly provides another way of securing response dependent on the constant components of the line impedance or in other words the zero sequence component of the impedance is prevented from effecting the relay response.

The selector relays have so far, that is, in Figs. 1, 2 and 5, been shown only in association with distance relay control circuits wherein the energization of the distance relays is controlled according to the number of phases involved in a fault and the type of fault. However, the usefulness of this selective control is not limited to this particular application. Thus, instead of controlling the energization of the distance relays so that they do not receive Y voltages during faults under the wrong conditions, they may be permanently connected for Y voltage energizations and prevented from controlling the power circuit under such wrong conditions. Furthermore, the selective feature may be incorporated in the protective distance relays themselves as shown in Fig. 4.

In this figure, six distance relays are shown, three of which are indicated by the reference number 43 and are connected to the circuit for delta voltage energizations to respond to interphase faults. The other three which are indicated by the reference number 44 have their voltage windings 23 permanently connected for Y voltage energizations. Each of the six distance relays is illustrated as having two sets of contacts, the upper, 45, being those of the ohm or distance element and the lower, 46, being those of the starting element. However, as such relays are well known to the art, they are merely schematically shown as comprising one voltage winding 23 and one current winding 22 to simplify the circuit diagram. In this arrangement the starting elements of the ground fault distance relay actually constitute the selective fault responsive means. Since, however, it is seldom convenient to provide a sufficiently large number of contacts on the starting elements, the necessary contacts may be provided in auxiliary relays 47, 48, 49 which are under the control of the respective starting elements of the distance relays 44.

In this embodiment of my invention, a ground fault involving one phase conductor is taken care of by the ground fault distance relay 44 associated with the faulty conductor. Thus, in case of a ground fault on phase conductor 10, the left-hand ground fault distance relay 44 will operate and through its starting unit contacts 46 complete the circuit of the auxiliary relay 47 whose energizing circuit is from minus, the conductor 50, the contacts 46 of the left-hand ground distance relay 44, the conductor 51, the winding of auxiliary relay 47 and the conductor 52 to plus. Upon the energization of the auxiliary relay 47 and the closing of the ohm element contacts 45 of the left-hand ground distance relay 44, the circuit of the trip coil 16 is completed as follows: From minus through the conductor 53, the middle closed contacts of the auxiliary relay 48, the middle closed contacts of the auxiliary relay 49, the conductor 54, the upper contacts of the auxiliary relay 47 which are now closed, the conductor 55, the ohm element contacts 45 of the left-hand ground distance relay 44, the conductors 56, 57 and 58, and the trip coil 16 to plus. It will readily be seen that if two or more of the ground fault distance relay starting elements close their contacts 46, then two or more of the auxiliary relays 47, 48 and 49 will be energized so that their two lower sets of normally closed contacts will be opened and the trip coil circuit cannot be completed as a result of the closing of the ohm element contacts 45 of the ground fault distance relays 44. The phase fault distance relays are connected to trip directly so that whenever their starting and ohm elements close their contacts simultaneously, tripping is effected.

Fig. 6 illustrates another embodiment of my invention in selective energization control as applied to what is known to the art as single-phase switching. With this type of switching, in case of a single-phase ground fault, the faulted conductor is disconnected, power transmission continuing over the sound conductors and ground or a neutral conductor, but on any other fault the line is to be completely disconnected. With such switching a single pole circuit breaker is provided for each of the phase conductors 10, 11 and 12. Each of these circuit breakers 110, 111 and 112 as shown in Fig. 6 has its own trip coil 116.

For selectively controlling the circuit breakers so that only one is opened on the occurrence of a single conductor to ground fault, I provide suitable fault responsive selective relay means 29, 30, 31 which may be of the voltage-current ratio type shown in Fig. 1. The contacts 34, 35 and 36 of these selector relays are so interconnected as to prevent the ground protective relay 42 from effecting the tripping of any of the circuit breakers 110, 111 and 112 if more than one phase conductor is involved in a fault. In a single phase to ground fault, however, tripping of only the circuit breaker in the faulted phase conductor is effected. The ground fault relay 42 is shown as a residual overcurrent relay but may be of any suitable type and preferably has a time element action.

Assuming, for example, a ground fault on phase conductor 10, then the fault responsive selector relay 29 associated with this conductor will operate opening its contacts 34 and 35 and closing its contacts 36. Also the ground fault relay 42 operates to close its contacts. The circuit of the trip coil 116 of the circuit breaker 110 is completed as follows: From minus through the conductor 60, the contacts of relay 42, the conductor 61, the contacts 35 of selector relay 30, the conductor 62, the contacts 34 of the selector relay 31, the conductor 63, the contacts 36 of selector relay 29, the conductor 65, the trip coil 116, the auxiliary switch 17 of circuit breaker 110 and the conductor 66 to plus. Similar trip circuits may be readily traced for ground faults involving either of the phase conductors 11 or 12.

In the event of two or more phase conductors being involved in a fault to ground the contacts 34 and 35 of at least two of the selector relays 29, 30 and 31 will be open by the time the relay 42 closes its contacts. Consequently no trip coil can be energized as the result of the operation of the ground relay.

In the event of a fault involving more than one phase, all of the circuit breakers are tripped simultaneously. For this purpose I provide suitable fault responsive means which for the sake of simple illustration are shown as simple time overcurrent relays 67, 68, 69, although other protective relays, examples of which are well known to the art, may be used. In accordance with my invention I provide a selective feature associated with the protective relays 67, 68, 69 such that even though one of these were to respond to a single line to ground fault none of the circuit breakers is tripped but if two or more respond all of the circuit breakers are tripped. For this purpose I provide each of the relays with two sets of normally open contacts 70, 71 which are arranged according to the schematic showing in Fig. 3d to effect the operation of a master tripping relay 72 only when two or more of the protective relays 67, 68 and 69 operate.

Assuming now a fault involving for example phase conductors 10 and 11, then the single-phase tripping is prohibited by the selector relays 29, 30 and 31 whether or not the fault involves ground as previously described. However, both of the protective relays 67 and 68 associated with the faulted conductors 10 and 11 operate and complete the circuit of the master tripping relay 72 as follows: From minus, the contacts 70 of the relay 67, the contacts 71 of the relay 68 and the winding of the tripping relay 72 to plus. Upon the energization of the relay 72 the circuit of each of the circuit breaker tripping coils 116 is completed as will be obvious from the drawings. The circuits which are completed in case of faults involving other phases will be obvious on inspection of the drawings.

In Figs. 3a to f inclusive I have illustrated schematically several selective switching arrangements whereby a circuit between two points A, B can be controlled in accordance with certain conditions. Thus for example Fig. 3a shows schematically the arrangement of the contacts 34, 35 and 36 of the fault responsive selector relays 29, 30 and 31 shown in Fig. 1. In this arrangement of contacts each selective device has two circuit opening and one circuit closing contacts, the contacts of the respective devices being indicated by the letters a, b and c. It will be observed that with this arrangement when only one unit operates, the circuit between A and B will be completed but if more than one unit operates the circuit will not be completed. In the arrangement shown in Fig. 3b the selector devices have two circuit closing contacts and one circuit opening contact. In addition to the contacts of the selector devices, there may be included the contact 9 of another device 42, as shown in Fig. 5. If this additional contact is not provided, then the arrangement is as shown in Fig. 2. With this arrangement it will be observed that if the contact 9 is not present or is assumed to remain closed, then the circuit between A and B will be completed only when two of the selector devices operate. Further selectivity is, of course, obtained by the addition of the contact 9, as set forth in connection with the explanation of the embodiment of my invention shown in Fig. 5.

Figure 3C:
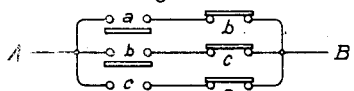

With the arrangement shown in Fig. 3c wherein each selector unit has one circuit opening and one circuit closing contact, it will be observed that the circuit between A and b will be completed when one or two units operate but not when three operate. In the arrangement shown in Fig. 3d, each selector unit is provided with two circuit closing contacts. Such an arrangement is embodied in the contacts 70, 71 of the phase selector relays 67, 68, 69 shown in Fig. 6. With this arrangement it will be clear that the circuit between A and B can be completed only when two or three units operate.

Figure 3F:
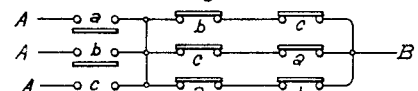

In Fig. 3e each of the selector units has two circuit opening contacts and one circuit closing contact. With this arrangement the circuit between A and B can be completed when one or three units operate but not when two units operate. The arrangement shown in Fig. 3f shows schematically the contacts of the selector relays 29, 30, 31 in Fig. 6. In this case the relays have one circuit closing and two circuit opening contacts. It will be clear that the circuit between any one of the points A and the point B can be completed only when only one of the selector relays operates. While I have illustrated only six different selective switching arrangements for the purpose of explaining my invention, other arrangements for other or the same applications are possible.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a protective arrangement for a polyphase alternating current electric circuit wherein circuit interrupting means are provided for opening the circuit, means for controlling said circuit interrupting means on the occurrence of faults including a single device to be operated under predetermined circuit conditions, a plurality of fault responsive means respectively associated with the current conducting paths of the circuit, each of said means being provided with a plurality of contacts and circuits interconnecting the contacts of the fault responsive means in one path with the contacts of the fault responsive means in other paths for controlling the operation of said single device in accordance with the particular phase conductor involved when not more than one conductor is faulted.

2. In a protective arrangement for a polyphase alternating current electric circuit wherein circuit interrupting means are provided for opening the circuit, means for controlling said circuit interrupting means on the occurrence of faults including a single device to be operated under predetermined circuit conditions, a plurality of fault responsive means respectively associated with the current conducting paths of the circuit, each of said means being provided with a plurality of contacts and circuits interconnecting the contacts of the fault responsive means in one path with the contacts of the fault responsive means in other paths for controlling the energization of said single device in accordance with the number of current conducting paths of the polyphase circuit involved in a fault.

3. In a protective arrangement for a polyphase alternating current electric circuit wherein fault responsive protective relay means are connected to be energized from the circuit for controlling the opening thereof on the occurrence of faults, a single device controlling the energization of said relay means and means for selectively controlling the operation of said device in accordance with the number of phases involved in the fault including a plurality of fault responsive means connected to be energized from the circuit.

4. In a protective arrangement for a polyphase alternating current electric circuit, a maximum of one distance protective relay for each phase of the circuit having a current winding connected to be energized in accordance with the current in a phase conductor of the circuit, means for varying the energization of the current winding by a predetermined amount of the residual current of the circuit and means for controlling said variation in current energization in dependence on the number of phase conductors involved in the fault.

5. In a protective arrangement for a polyphase alternating current electric circuit, a maximum of one distance protective relay for each phase of the circuit having a current winding connected to be energized in accordance with the current in a phase conductor of the circuit and means for adding a predetermined residual current energization to said winding when only one phase conductor is faulted and for reducing the current energization in accordance with a predetermined amount of the residual current when more than one phase conductor is faulted.

6. In a protective arrangement for a polyphase alternating current electric circuit wherein circuit interrupting means are provided to open the circuit, fault responsive distance relay means for effecting the opening of said circuit interrupting means on the occurrence of abnormal circuit conditions connected to be energized in accordance with the delta and the Y voltages of the circuit and selectively operable fault responsive means for preventing the opening of said circuit interrupting means in response to said Y voltage energization for faults involving at least two phases of the circuit.

7. In a protective arrangement for a polyphase alternating current electric circuit wherein a relay has current and voltage windings connected to be energized from the circuit to operate in accordance with the distance between the relay and a fault, means for connecting said voltage winding for energization in accordance with either one of two different voltages of the circuit and fault responsive means connected to be energized from the circuit for controlling said connecting means to prevent energization of said voltage winding in accordance with one of said voltages on the occurrence of a fault involving at least two phase conductors of the circuit.

8. In a protective arrangement for a polyphase alternating current electric circuit including a relay which has current and voltage windings connected to be energized from the circuit to operate in accordance with the distance between the relay and a fault, means for connecting said voltage winding for energization in accordance with either one of two different voltages of the circuit and means responsive to a predetermined relation between a current and a voltage of the circuit for controlling said connecting means to effect the energization of said voltage winding in accordance with one of said voltages under a given fault condition of the circuit and in accordance with another one of said voltages under a different fault condition.

9. In a protective arrangement for a polyphase alternating current electric circuit wherein protective relays have current and voltage windings connected to be energized from the circuit for operation in accordance with the distance between the relays and the fault, connecting means for simultaneously controlling the energization of the windings of said protective relays and fault responsive means connected to be energized from the circuit selectively operable to control said connecting means in accordance with the number of phases involved in the faults.

10. In a protective arrangement for a polyphase alternating current electric circuit wherein a maximum of one protective relay for each phase of the circuit has current and voltage windings connected to be energized from the circuit for operation in accordance with the distance between the relay and the fault, connecting means for controlling the energization of the current windings of said protective relays and fault responsive means connected to be energized from the circuit for controlling said connecting means selectively operable to control the energization of the connecting means in accordance with the number of phases involved in a fault.

11. In a protective arrangement for a polyphase alternating current electric circuit wherein a relay for each phase of the circuit has current and voltage windings connected to be energized from the circuit to operate in accordance with the distance between the relay and a fault, means for connecting said voltage windings for energization in accordance with the voltages between the phase conductors of the circuit and the Y voltages of the circuit and selective relay means connected to be energized from the circuit for controlling said connecting means to effect the energization of said voltage windings in accordance with the Y voltages of the circuit only on the occurrence of a fault involving a single phase conductor and in accordance with the voltages between the phase conductors for all other faults.

12. In a protective arrangement for a polyphase alternating current electric circuit wherein a relay for each phase of the circuit has current and voltage windings connected to be energized from the circuit to operate in accordance with the distance between the relay and a fault, means for connecting said voltage windings for energization in accordance with the voltages between the phase conductors of the circuit and the Y voltages of the circuit and fault responsive means connected to be energized from the circuit for preventing said connecting means from connecting any of said voltage windings for energization in accordance with the Y voltages of the circuit except on the occurrence of a ground fault involving only one phase conductor.

13. In a protective arrangement for a polyphase alternating current electric circuit wherein a distance relay for each phase of the circuit has current and voltage windings connected to be energized from the circuit for operation in accordance with the distance between the relay and a fault, means for energizing the voltage windings of said relays in accordance with the Y voltages of the circuit for faults involving only one phase conductor and ground and in accordance with the delta voltages of the circuit for faults involving two phase conductors and ground and means for energizing the current windings in accordance with the currents in the respective phase conductors of the circuit and increasing the energization of the current winding of the relay in the faulty conductor by a current proportional to the zero phase sequence current of the circuit when the voltage windings are energized by Y voltage and decreasing the energization of the current windings of the relays in the faulty conductors in accordance with a current dependent on the zero phase sequence current when the voltage windings are energized by the delta voltages.

14. In a protective arrangement for a polyphase alternating current electric circuit wherein circuit interrupting means are provided for opening the circuit, means for controlling said circuit interrupting means on the occurrence of faults including a single device to be operated under predetermined circuit conditions, a plurality of fault responsive means respectively associated with the current conducting paths of the circuit, each of said means being provided with a plurality of contacts and circuits interconnecting the contacts of the fault responsive means in one path with the contacts of the fault responsive means in other paths for controlling the operation of said single device in accordance with the number of phase conductors involved in a fault.

ALBERT R. van C. WARRINGTON.